US012669204B2

(12) United States Patent
R

(10) Patent No.: US 12,669,204 B2
(45) Date of Patent: Jun. 30, 2026

(54) DEVICE AS QUICK COUPLING INTERFACE FOR DUAL DOCKING AND REFUELLING

(71) Applicant: Orbitaid Aerospace Pvt. Ltd., Bangalore (IN)

(72) Inventor: Sakthikumar R, Perambalur (IN)

(73) Assignee: Orbitaid Aerospace Pvt. Ltd. (IN)

( * ) Notice: Subject to any disclaimer, the term of this patent is extended or adjusted under 35 U.S.C. 154(b) by 102 days.

(21) Appl. No.: 18/730,891

(22) PCT Filed: Jan. 23, 2023

(86) PCT No.: PCT/IN2023/050072
§ 371 (c)(1),
(2) Date: Jul. 22, 2024

(87) PCT Pub. No.: WO2023/139613
PCT Pub. Date: Jul. 27, 2023

(65) Prior Publication Data
US 2024/0392906 A1      Nov. 28, 2024

(30) Foreign Application Priority Data

Jan. 22, 2022    (IN) .............................. 202141048229

(51) Int. Cl.
*F16L 37/32*          (2006.01)
*B64G 1/40*           (2006.01)
(Continued)

(52) U.S. Cl.
CPC ............ *F16L 37/32* (2013.01); *B64G 1/4024* (2023.08); *B64G 1/6464* (2023.08); *F16L 37/002* (2013.01); *F16L 37/56* (2013.01)

(58) Field of Classification Search
CPC .. B64G 1/4024; B64G 1/6464; B64G 1/6462; F16L 37/32; F16L 37/002; F16L 3/56
See application file for complete search history.

(56) References Cited

U.S. PATENT DOCUMENTS

| | | | |
|---|---|---|---|
| 7,861,974 B2 | 1/2011 | Hays et al. | |
| 2007/0228220 A1* | 10/2007 | Behrens ............... | B64G 1/6464 |
| | | | 244/172.5 |

(Continued)

FOREIGN PATENT DOCUMENTS

| | | |
|---|---|---|
| FR | 2511970 A1 | 11/1983 |
| JP | 3763613 B2 | 4/2006 |

OTHER PUBLICATIONS

Nyberg et al. (WO Pub No. 2009/056139 A1) Pub date May 7, 2009 (Year: 2009).*

(Continued)

*Primary Examiner* — Rodney A Bonnette

(57)          ABSTRACT

A device 100 for a service vehicle for docking with and transferring a fluid to a vehicle in motion is disclosed. The device 100 includes a first part 105 and a second part 110. The first part 105 is communicatively coupled to the service vehicle and the second part 110 to the vehicle in motion. A guide pin 106 of the first part 105 is configured for being inserted into a guide pin holder 112 of the second part 110 for actuating a servomotor 102B of the first part 105 for capturing of the second part 110. Two or more male quick couplings 102 of the first part 105 are configured for being inserted into two or more female quick couplings 110 of the second part 110 for initiating a latching mechanism using the servomotor 102A of the first part 105 for hard clamping with the first part 105.

8 Claims, 11 Drawing Sheets

(51) Int. Cl.
 B64G 1/64 (2006.01)
 F16L 37/00 (2006.01)
 F16L 37/56 (2006.01)

(56) References Cited

U.S. PATENT DOCUMENTS

2009/0173832 A1* 7/2009 Hays .................... B64G 1/6464
 244/172.4
2014/0112699 A1* 4/2014 Lewkoski ............... F16L 39/04
 403/33
2018/0238480 A1* 8/2018 Scott ....................... F16L 37/56
2021/0073692 A1* 3/2021 Saha ................ G06Q 10/06316
2022/0332444 A1 10/2022 Roopnarine

OTHER PUBLICATIONS

First Examination Report in Indian Application No. 202141048229, mailed on Mar. 13, 2023, 5pages.
International Search Report and Written Opinion in PCT Application PCT/IN2023/050072 mailed Apr. 27, 2023, 8 pages.

* cited by examiner

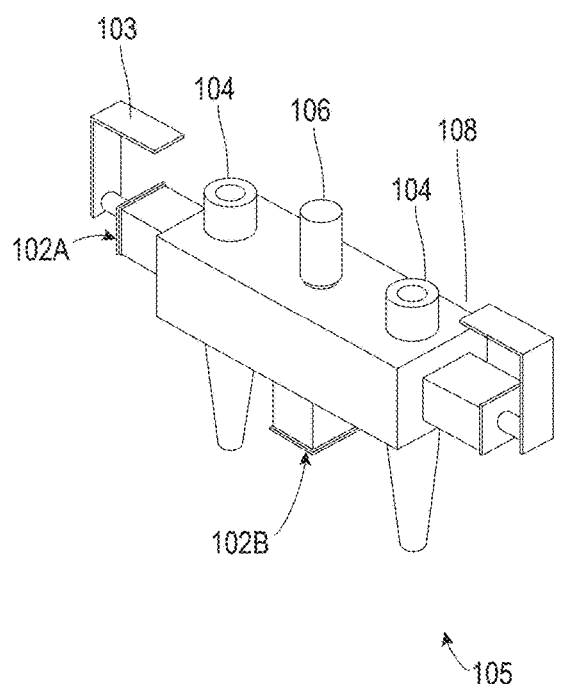
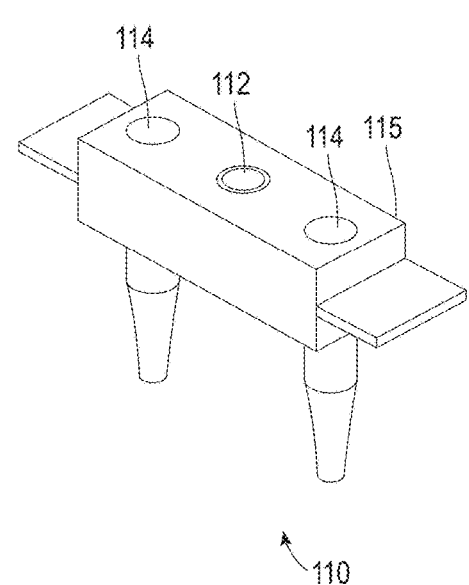
FIG. 1

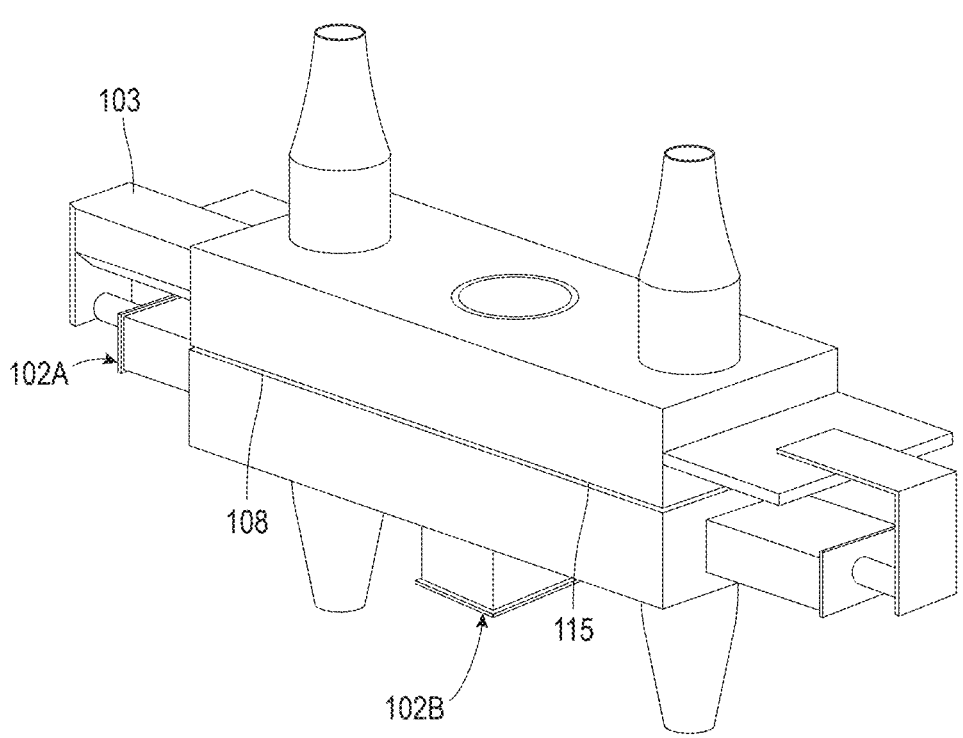
FIG. 2

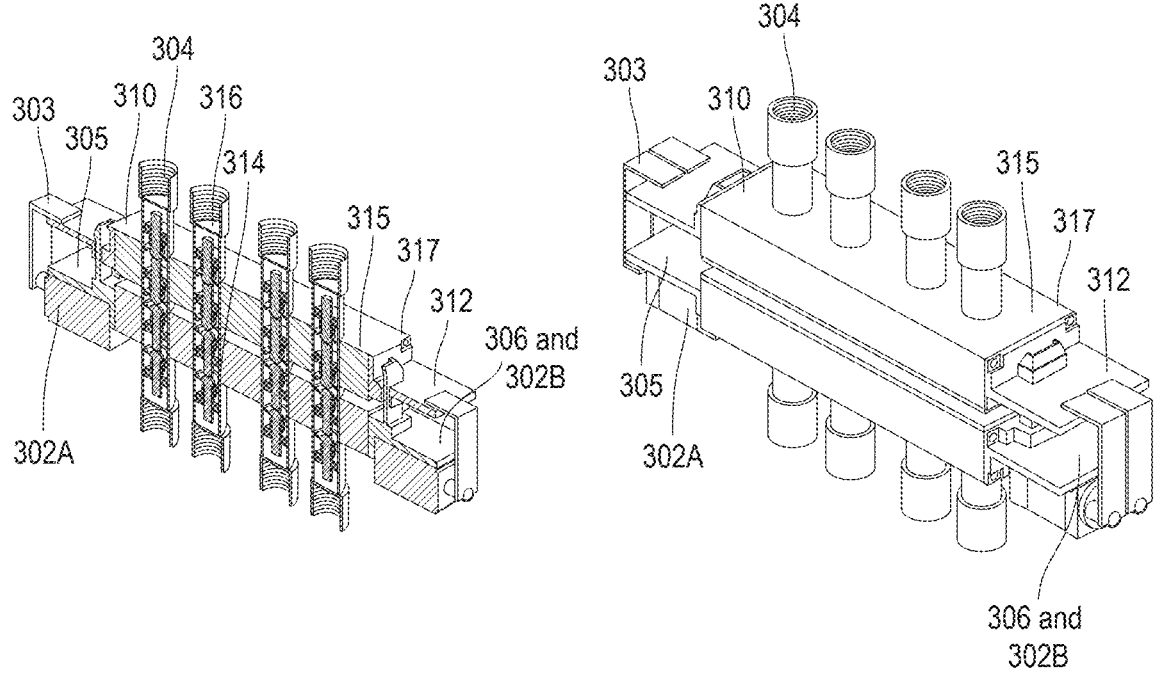
FIG. 3(a)                    FIG. 3(b)

DEVICE AS QUICK COUPLING INTERFACE FOR DUAL DOCKING AND REFUELLING

FIELD OF TECHNOLOGY

The present disclosure generally relates to device for docking and refuelling vehicles and more particularly relates to device for a service vehicle in motion for autonomously docking with and transferring a fluid to a vehicle that is in motion.

BACKGROUND

Current satellite architectures are designed for the space vehicle to operate in an inaccessible, hostile environment. Following launch, traditional satellite operations are tightly constrained by an inability to access the orbiting vehicle. Except for software upgrades from ground controllers, operators have no choice but to support payload technologies that become rapidly obsolete and to bus structures that degrade in the harsh environment of space. The next launch's inaccessibility makes them vulnerable to failures before reaching the end of life (EOL).

Historical analysis indicates that the combination of the failure rate of about nine percent during the operational lives of satellites and the failure rate of four to five percent during launch of satellites, may cause approximately one out of seven satellites to fail before EOL. This is particularly unfortunate given that a typical geosynchronous equatorial orbit (GEO) satellite costs approximately $125 million for the satellite and launch vehicle. In addition to the high cost of space commercialization, critical mission areas fulfilled by government space programs and the drive for investor return by the commercial space industry have led to a highly risk-averse industry. This environment has driven satellite designers toward three common elements of design: redundancy, proven technology, and long operational lives.

With ever-shrinking budget constraints facing the military and civilian contractors, the ability to get the most out of the funds allocated has become a significant factor in all programs. The ability to extend the operational life of any system for minimal cost compared to a complete system replacement would make that system much more desirable and saleable. For example, if a satellite design life of about five years could be extended to seven years, over twenty years, a savings of more than one satellite and its associated launch cost could be realized. In the opinion of experts, fuel usage drives the operational restrictions placed on satellites, with fuel being closely managed to utilize the complete satellite design life. A fully functional satellite, which has depleted its maneuvering/station-keeping fuel to reserve levels, is no longer usable. The reserve fuel must be used to boost the satellite into a super-synchronous orbit to vacate the geosynchronous slot for a replacement satellite. A second option is to use all fuel for on-station maneuvering and allow the satellite to drift toward the nearest "graveyard orbit," which further complicates the space debris problem.

In past decades, almost two hundred satellites worth about $100 billion had to be destroyed because of fuel depletion. The ability to replenish satellite maneuvering fuel in orbit could result in a significant extension of satellite operational life.

Refuelling a satellite in space or orbit sounds pretty simple from what we know about filling up our cars here on the ground, just open the cap, connect the fuel nozzle to fill the tank, and send the vehicle. But due to many obstacles in space, it is a much more complicated process, than what we think.

First, the fuel valves of the satellites in space today were not designed to be accessed after launch. Instead, satellite manufacturers tightly lock down the fuel valve with wired-shut caps to prevent precious fuel from escaping during launch and operation. These caps must be removed before anyone can access the valve. Then, pumping fluid in the microgravity environment of space is an entirely a different matter than transferring a fluid on the ground. Without gravity to settle the fluid at the bottom of a tank, like on earth, tank plumbing and pumps must be more specialized to operate in the microgravity environment of space correctly. Also, there is no provision for docking with the satellite. Finally, to make the challenge even more complex, most satellites that would benefit most from servicing are in geosynchronous earth orbit or geosynchronous equatorial orbit (GEO), low earth orbit (LEO), cis-lunar orbit, or interplanetary missions.

A satellite in orbit is inaccessible to humans, which means that only robots can do the job of refuelling. A service satellite performs the rendezvous operation with the robotic operation to the "client" satellite. To refuel the existing satellites two robotic arms are required. One robotic arm to dock in the bottom ring and another robotic arm to perform refuelling operations.

Existing solutions for refuelling satellites include use of two robotic arms for operation. The robotic refuelling arm performs the following steps:

i. Remove or cut the Multi-Layer Insulation (MLI) or thermal insulation, ii. Cut the lock wire and remove the tertiary cap, iii. Remove the actuation nut, iv. Open the fuel valve, v. Connect the flexible hose and refuel the satellite, and vi. Finally, reverse the operations for closing the system and in reverse of the order above.

The challenge associated with refuelling the satellite using the solution mentioned above includes the use of specialized robotic tools for each of the steps. Each specialized tool adds weight to the satellite, resulting in increased launch cost. Because of the weight of this tool, clients cannot carry more payloads or fuel.

Thus, there exists a need for a solution to overcome, or at the least, mitigate the deficiencies mentioned above.

SUMMARY

This summary is provided to introduce concepts of the subject matter in a simple manner that is further described in the detailed description of the disclosure. This summary is not intended to identify key or essential inventive concepts of the subject matter nor is it intended to determine the scope of the disclosure.

To overcome at least some of the problems mentioned above, there exists a need for a solution that includes both docking and refuelling ports in the same device. This device is drop-in technology i.e., can be implemented without changing the existing design of the rest of the crafts. By implementing the disclosed device, only two steps need to be performed. The first step may include docking the satellite and the second step may include initiating the refuelling process. The reduction in steps results in the reduction in weight, refuelling steps, and ease of transfer of fluid in orbit.

In addition to the above, there exists a need for a low-cost, low weight refuelling mechanism compared to the solutions currently available.

A device for a service vehicle in motion for autonomously docking with and transferring a fluid to a vehicle that is in motion is disclosed. The device includes a first part and a second part. The first part is communicatively coupled to the service vehicle and the second part is communicatively coupled to the vehicle in motion. It has to be noted here that in this disclosure the term communicatively coupled refers to communication of both electrical and electronic signals and communication or flow of a fluid. In other words, it could be expressed as coupled such that a fluid can be communicated and also electrical and electronic signals. That means the connection or coupling constitutes not only tubing for fluid communication but also conductive wires and other means of signal communication such as optic fibers, for example. However, for the sake of brevity and clarity the term communicatively coupled is used. At least one guide pin of the first part is configured for being inserted into at least one guide pin holder of the second part and for actuating a servo motor of the first part for enabling a soft capturing of the second part into the first part. Two or more male quick couplings of the first part are configured for being inserted into two or more female quick couplings of the second part for initiating a latching mechanism using the servo motor of the first part for hard clamping of the second part into the first part for transferring a fluid to the vehicle in motion from the service vehicle.

The above summary is illustrative only and is not intended to be in any way limiting. In addition to the illustrative aspects, example embodiments, and features described above, further aspects, example embodiments, and features will become apparent by reference to the drawings and the following detailed description.

BRIEF DESCRIPTION OF THE FIGURES

These and other features, aspects, and advantages of the exemplary embodiments can be better understood when the following detailed description is read with reference to the accompanying drawings in which like characters represent like parts throughout the drawings, wherein:

FIG. 1 illustrates a first part and a second part of a device for a service vehicle for autonomously docking with and transferring a fluid to a vehicle that is in motion, in accordance with an embodiment of the present disclosure;

FIG. 2 illustrates the device of FIG. 1 with the first part and the second part thereof in the mated state or in the stated ready to transfer fluid;

FIG. 3 illustrates: (a) a sectional view of a complete assembly and (b) an isometric view of the complete assembly of the disclosed device, in accordance with an embodiment of the present disclosure;

Figures 4A, 4B, 4C, 4D:
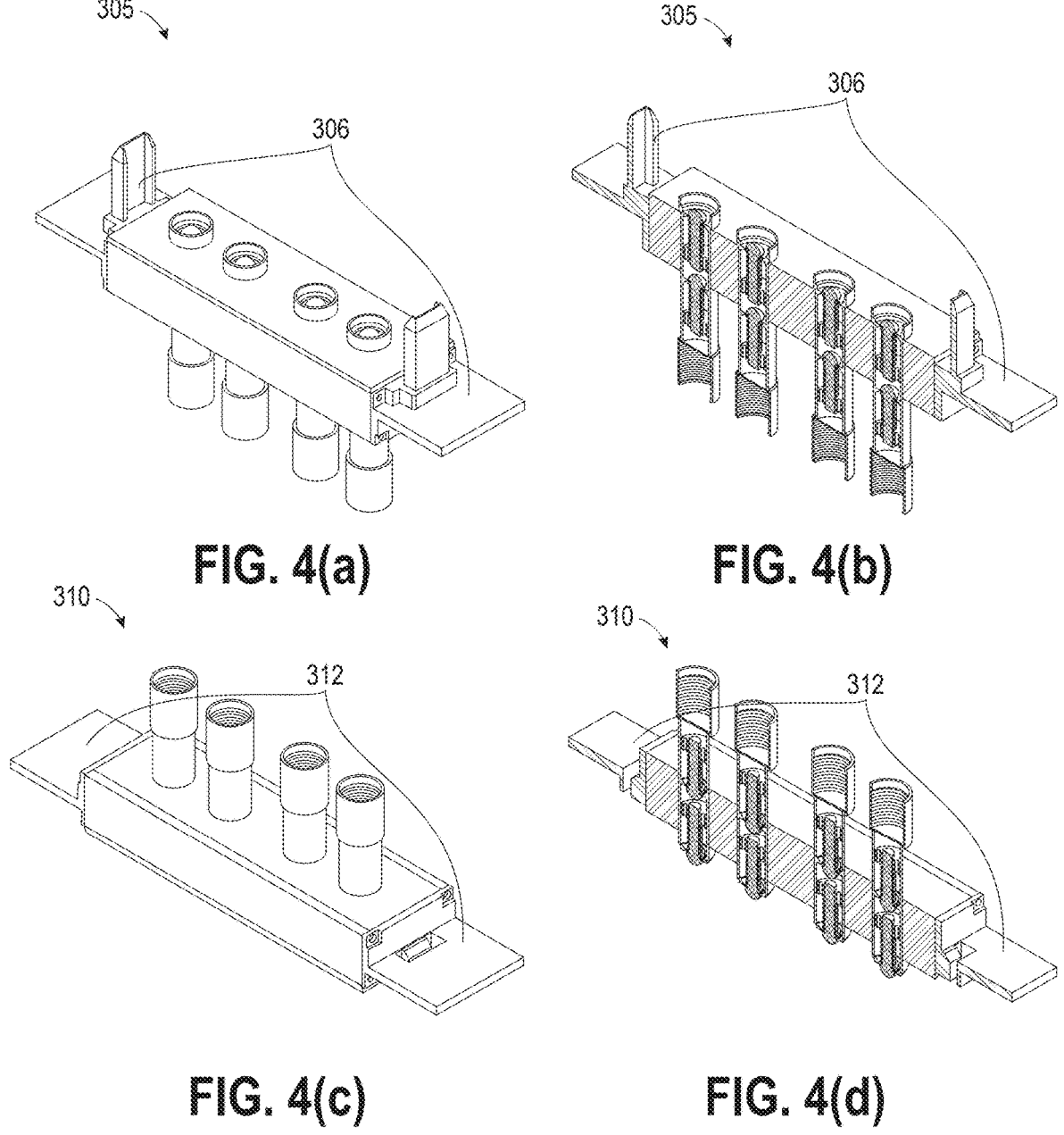
FIG. 4 illustrates: (a) an isometric view of coupling half of the device, (b) a sectional isometric view of coupling half of the device, (c) an isometric view of the target half the device, and (d) a sectional isometric view of the target half of the device, in accordance with an embodiment of the present disclosure.

Further, skilled artisans will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those of ordinary skill in the art having the benefit of the description herein.

DETAILED DESCRIPTION

For the purpose of promoting an understanding of the principles of the invention, reference will now be made to the embodiments illustrated in the figures and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are exemplary and explanatory of the invention and are not intended to be restrictive thereof.

The terms "comprise", "comprising", or any other variations thereof, are intended to cover a non-exclusive inclusion such that a process or method that comprises a list of steps does not comprise only those steps but may comprise other steps not expressly listed or inherent to such a process or a method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this invention belongs. The system, methods, and examples provided herein are illustrative only and not intended to be limiting.

In some embodiments, the word 'satellite', a 'vehicle in motion' used in the description may reflect the same thing, i.e., the moving vehicle being refueled and may be used interchangeably. In some embodiments, the word 'fluid', 'fuel', and 'propellent' used in the description may reflect the same meaning and may be used interchangeably. In some embodiments, the word 'first part' of a device, a 'coupling half' or 'chaser half' of the device used in the description may reflect the same meaning and may be used interchangeably. In some embodiments, the word 'second part' of a device and a 'target half' of the device used in the description may reflect the same meaning and may be used interchangeably. In some embodiments, the word 'client satellite' or the 'vehicle in motion' or the 'target satellite' used in the description may reflect the same meaning and may be used interchangeably. It is to be noted that the term dual docking referred to herein implies the first docking initiated by a guide pin of the first part of the device and the second docking action of clamping or latching using the servo motor.

Embodiments of the present invention will be described below in detail with reference to the accompanying figures.

FIG. 1 illustrates a first part 105 and a second part 110 of a device 100, the device 100 for a service vehicle in motion for autonomously docking with and transferring a fluid to a vehicle that is in motion, in accordance with an embodiment of the present disclosure. The device 100 for a service vehicle in motion (not shown) for autonomously docking (with the help of an artificial or machine vision system or camera or LiDAR) with and transferring a fluid to a vehicle that is in motion (now shown) is disclosed. The device 100 includes the first part 105 and the second part 110. The first part 105 is communicatively coupled to the service vehicle and the second part 110 is communicatively coupled to the vehicle in motion.

The first part 105 of device 100 is also referred to as a coupling half or chaser half. The first part (coupling half) 105 includes two or more refuelling male quick couplings 104, a first coupling holder 108, at least one guide pin 106, a first holding plate and a servo motor 102A with latching mechanism and a servo motor 102B with a guide pin and is communicatively coupled to the service satellite.

The first part 105 of the device 100 comprises a first coupling holder 108 configured for holding the two or more male quick couplings 104. The male quick couplings 104 may be of threaded type or one of unthreaded type or welded quick couplings or guide pin threaded or slotted type. The first part 105 of device 100 comprises a first holding plate for connecting the first coupling holder 108 and the at least one guide pin 106.

It is to be noted that, the first part 105 illustrates only one guide pin 106 but is not limited to only one guide pin as shown and can include more than one guide pin 106. Similarly, the first part 105 illustrates two male refuelling quick couplings 104, but is not limited to only two male refuelling quick couplings and can include more than two male refuelling quick couplings 104. The alternative embodiments in the later part of the description and FIGS. 3-10 illustrate the device with more than one guide pin and more than two refuelling quick couplings.

The second part 110 of the device 100 also referred to as target half includes two or more refuelling quick coupling (female) 114, a second coupling holder 115, a guide pin holder 112, and a second holder plate, and is communicatively coupled to the vehicle in motion. The second part 110 of the device 100 comprises a second coupling holder 115 configured for holding the two or more female quick couplings 114 of one of threaded type and unthreaded type or welded type quick couplings or guide pin threaded or slotted type. The second part 110 of the device 100 comprises a second holding plate for connecting the second coupling holder 115 and the at least one guide pin holder 112.

The quick couplings (male 104 and female 114) used in the first part 105 and the second part 110 are used to provide fast and easy connection and disconnection of fluid or air or Helium or Nitrogen lines. These fittings are also known as quick connects or quick release couplings. They are used to replace fitting connections that may require tools to assemble and disassemble. The quick couplings include self-sealing mechanism without any additional support.

FIG. 2 illustrates the device 100 of FIG. 1 with the first part and the second part thereof in the mated state 200 or in the stated ready to transfer fluid, in accordance with an embodiment of the present disclosure.

The service vehicle may comprise one or more of an artificial or machine vision system or camera or LiDAR for locating the vehicle in motion and initiating steps for autonomously docking with the vehicle in motion based on the position of vehicle in motion and enabling the service vehicle for transferring the fluid to the vehicle in motion upon docking with the first vehicle.

The at least one guide pin 106 is of threaded type and configured for enabling the soft capturing of the second part 110 by the first part 105 with translational movement without affecting the positions of the service vehicle and the vehicle in motion. The at least one guide pin 106 acts as self-aligning primary docking mechanism. It is to be noted that the soft capturing of the second part 110 by the first part 105, avoids hitting of the two or more male quick couplings 104 of the first part 105 with the two or more female quick couplings 114 of the second part 110, and thereby ensures protection of two or more male 104 or female 114 quick couplings.

The at least one guide pin 106 of the first part 105 is configured for being inserted into at least one guide pin holder 112 of the second part 110 for actuating a servo motor 102B of the first part 105 for enabling a soft capturing of the second part 110 by the first part 105. The two or more male quick couplings 104 of the first part 105 are configured for being inserted into the two or more female quick couplings 114 of the second part 110 and then a latching mechanism is initiated using the servo motor 102A of the first part 105 for hard clamping or rigid clamping of the second part 110 into the first part 105 for transferring a fluid to the vehicle in motion.

The rotation of the servo motor 102A is coupled to the clamp 103 through a screw and nut device, in such a way that the rotation of the servo motor 102A translates into a linear motion of the clamp 103, thereby effecting clamping. The rotation of the servo motor 102B is coupled to the guide pin 106. When power is supplied to the servo motor 102B, the torque applied to the guide pin 106 rotates it and it softly docks with the guide pin holder 112, in the case of the threaded type of guide pin. Similar suitable arrangements may easily be implemented for docking, by a person skilled in the art for unthreaded types of guide pin.

The device 100 includes two or more bubble suppressors placed in the path of the fluid in the two or more male quick couplings 104 of the first part 105 and in the two or more female side quick couplings 114 of the second part 110 for transferring the fluid without bubbles to the vehicle in motion. The fluid is transferred through quick couplings (male 104) and (female 114) and the bubble suppressor ensures the bubble is not entering into the target satellite. Due to micro-gravity conditions, there is a possibility of bubble formation in the tank because of surface tension. If the bubble is entering into the target satellite, then the feedline may be choked, and after that, the client satellite cannot be used for any thrusters firing or any further operations.

The transferring of the fluid to the vehicle in motion is done using a flow control valve and e-pump which is a completely electrically operated pump or using pressurization method, through the two or more male quick couplings 104 and the bubble suppressor.

The service module in the service vehicle is configured for sending a command for undocking the vehicle in motion after transferring the fluid, for releasing the latching mechanism by the first part 105 and moving the guide pin 106 away from the guide pin holder 112 of the second part 110.

The alternative embodiments of the present disclosure are described in detail below and shown from FIG. 3-5 and FIG. 10.

Figure 5:
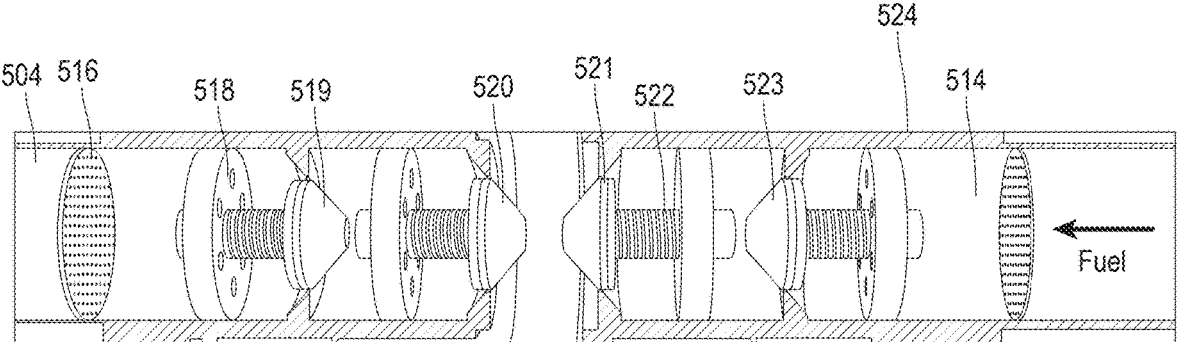
FIG. 5 illustrates a sectional view of refuelling quick couplings in open position, in accordance with an embodiment of the present disclosure.
Figure 6:
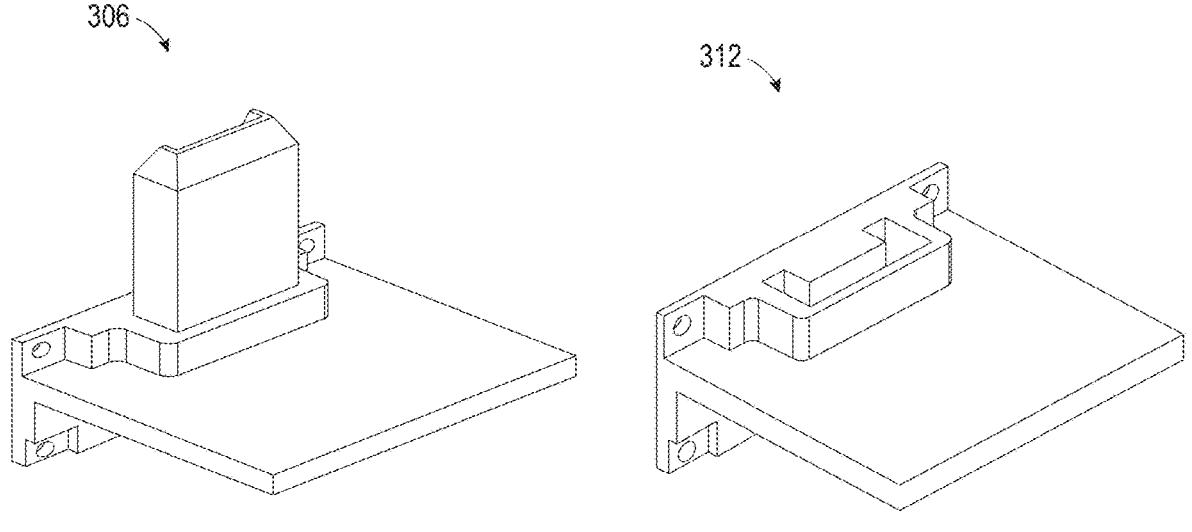
FIG. 6 illustrates: isometric view of (a) guide pins (coupling half), (b) guide pins holders (target half), in accordance with an embodiment of the present disclosure.
Figure 7:
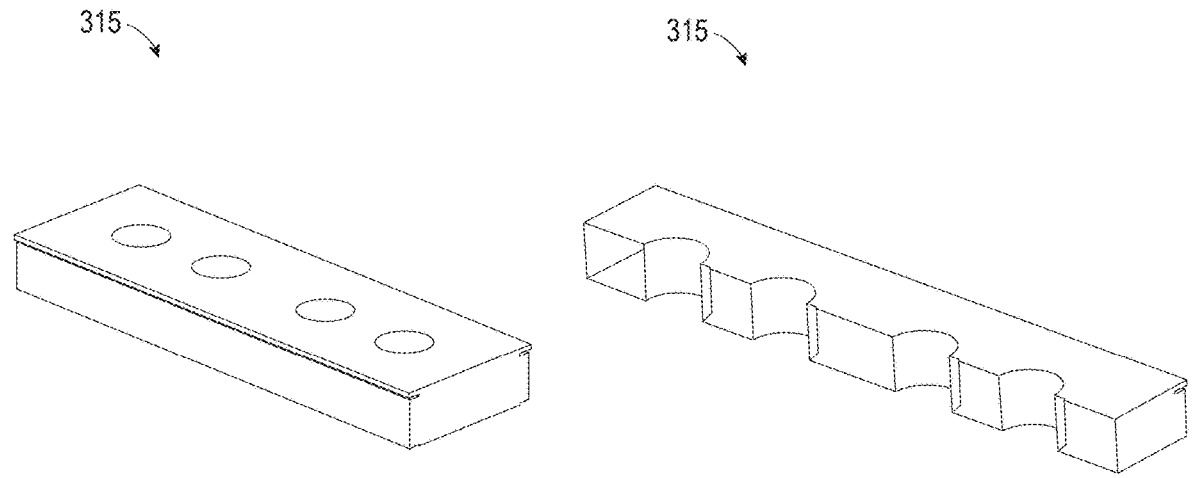
FIG. 7 illustrates: (a) an isometric view of quick couplings holder and (b) a sectional view of quick couplings holder, in accordance with an embodiment of the present disclosure.

FIG. 3 illustrates: (a) a sectional view of a complete assembly of a device (b) an isometric view of the complete assembly of the device, in accordance with an embodiment of the present disclosure. FIG. 4 illustrates: (a) an isometric view of coupling half of the device (b) a sectional isometric view of coupling half of the device (c) an isometric view of the target half the device, (d) a sectional isometric view of the target half of the device, in accordance with an embodiment of the present disclosure. FIG. 5 illustrates a sectional view of refuelling quick couplings in open position, in accordance with an embodiment of the present disclosure. FIG. 6 illustrates: isometric view of (a) guide pins (coupling half), (b) guide pins holder (target half), in accordance with an embodiment of the present disclosure. FIG. 7 illustrates: (a) an isometric view of quick couplings holder and (b) and sectional view of quick couplings holder, in accordance with an embodiment of the present disclosure.

Figure 8:
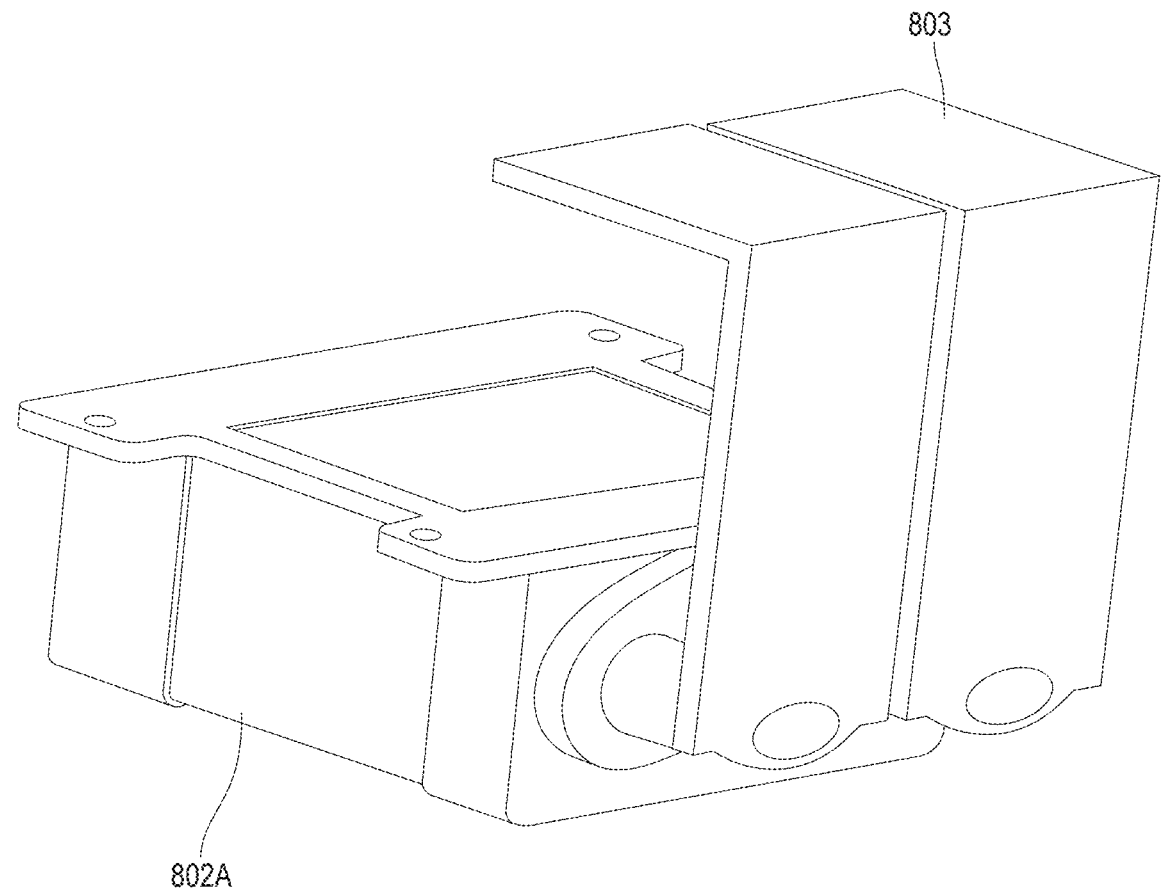
FIG. 8 illustrates a servo motor along with a clamp, in accordance with an embodiment of the present disclosure.

FIG. 8 illustrates servo motor with a latching mechanism, in accordance with an embodiment of the present disclosure. As mentioned above, the rotation of the servo motor 802A is connected to the clamp 803 in such a way that the rotation of the servo motor 802A translates into a linear motion of the clamp 803 thereby effecting clamping of the second part 110 (of FIG. 1) with the first part 105 (of FIG. 1) for transferring the fluid to the vehicle in motion from the service vehicle. The servo motor 802A is connected to the clamp 803 through any known suitable mechanism, depending on the location and orientation of the servo motor 802A, for example, through ball screw and nut, worm and gear, or pawl and ratchet, and so on. Such mechanisms for translating rotary motion into linear motion are well known in the art related to the art to which this disclosure belongs and a person skilled in the art would be able to select the most effective, efficient, and reliable mechanism while reducing the teachings of this disclosure to practice.

Figure 9:
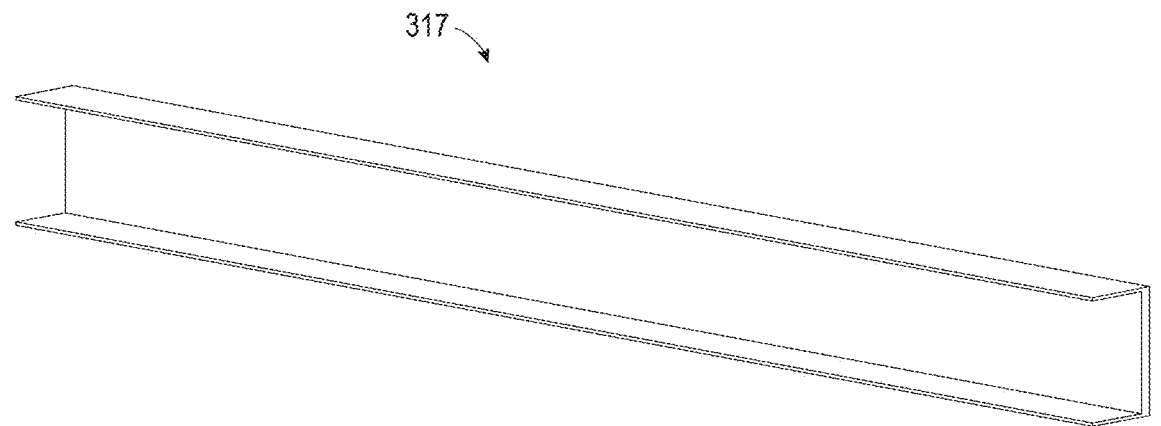
FIG. 9 illustrates a holder plate, in accordance with an embodiment of the present disclosure.
Figure 10A:
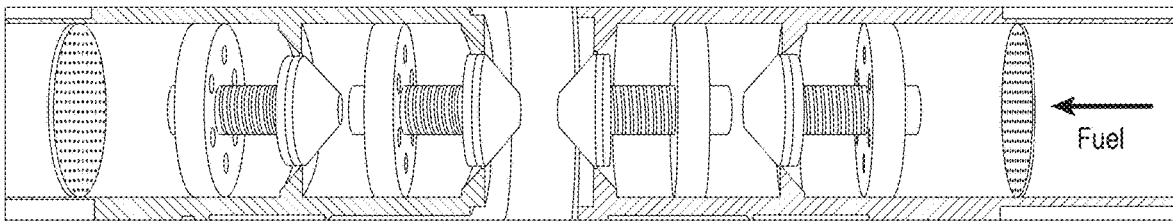
FIG. 10 illustrates refuelling quick coupling sequence of operation of transferring a fluid to a vehicle that is in motion using the device as disclosed, in accordance with an embodiment of the present disclosure.
Figure 10B:
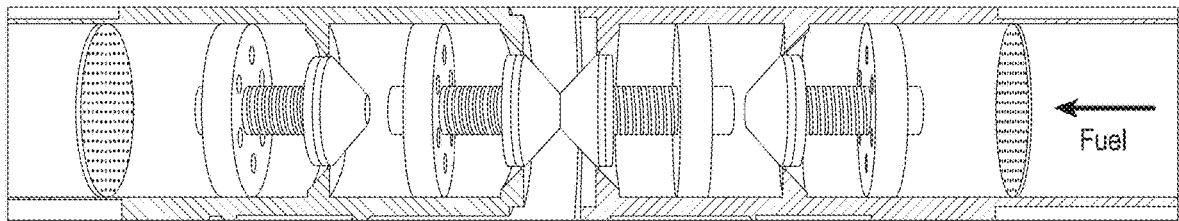
Figure 10C:
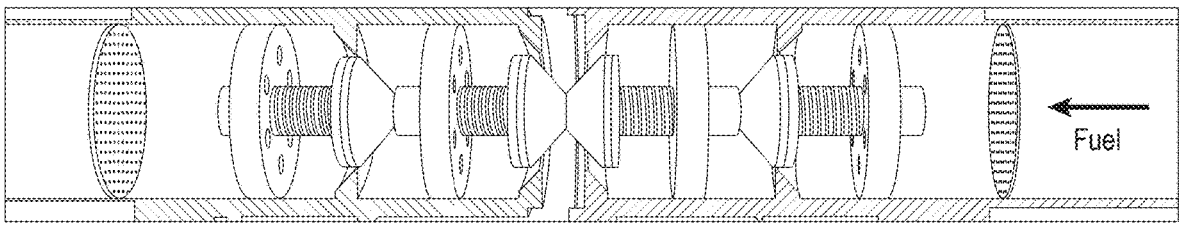
Figure 10D:
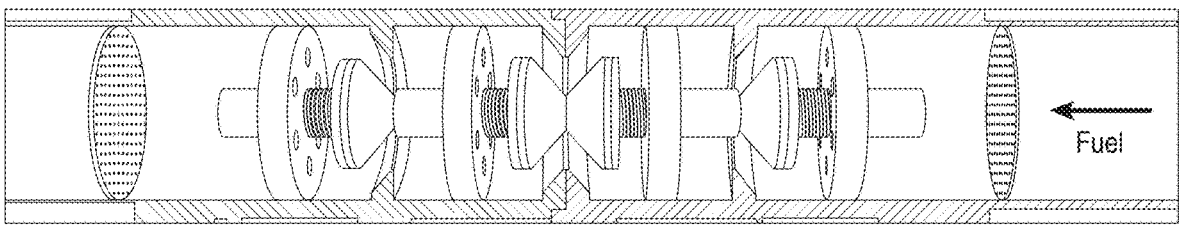

FIG. 9 illustrates a holder plate, in accordance with an embodiment of the present disclosure, and FIG. 10 illustrates refuelling quick coupling sequence of operation of transferring a fluid to a vehicle that is in motion using the device as disclosed, in accordance with an embodiment of the present disclosure. A brief explanation of its working is provided further below.

The paragraphs below explain the elements of the disclosed device in detail.

Coupling half: The coupling half includes refuelling quick couplings (female), coupling holder, guide pin with servo motor, holding plate, and a drive motor which is a servo motor with a latching mechanism. The coupling half is communicatively coupled to the service satellite. In another embodiment, the coupling half may also be communicatively coupled to propulsion systems of the service satellite.

Target half: The target half of the device includes a refuelling quick coupling (male), a coupling holder, a guide pin holder, and a holder plate. The target half is communicatively coupled to the client's satellite. In another embodiment, the target half may also be communicatively coupled to a propulsion system of the client's satellite.

It is to be noted that, the quick couplings used in the 'coupling half' of the device may be female quick couplings and the quick couplings used in the 'target half' may be male quick couplings instead of the hitherto described configuration. This interchange does not affect the performance of the disclosed device and both configurations are based on the same inventive principles.

Refuelling quick couplings: The quick couplings (female and male together) are used to fill or refuel and drain a fluid. In one example, the fluid may be a fuel or oxidizer or a gaseous propellant. The quick couplings consist of a bubble suppressor, two-stage shut-off valves with the perforated disc, springs, and necessary sealings.

A bubble suppressor makes sure to suppress the bubble while filling or refuelling the satellite in-ground or in micro-gravity conditions. The shut-off valve allows an area to transfer the propellants. Finally, the end connections of the quick couplings are connected with the service satellites and the clients' satellite propulsion systems.

Quick coupling holder: It will hold the quick couplings either by threaded or welded or any other type such as quick couplings or guide pin threaded or slotted mechanism.

Guide pin with servo motor and guide pin holder: The guide pin with servo motor and the guide pin holder make sure that service satellite and target satellite dock accurately. The servo motor also referred to as drive motor is used to actuate the primary docking.

Holding plate: It is used to connect quick coupling holders and guide pins.

Servo motor with latching mechanism: The servo motor or drive motor is used to actuate the latching mechanism. The latching mechanism is used to clamp the device target half and device coupling half.

The device coupling half is connected in the service satellite with the necessary pumping and flowline system. Similarly, the device target half is connected with the target satellite. The service satellite approaches the target satellite with the essential Guidance, navigation, and control (GN&C) and propulsion system. A service satellite performs the rendezvous operation to the client's satellite. When the service satellite is near the target satellite, the guide pins of the coupling half touch the device target half at the matching place, for example, the at the guide pin holder, then servo motor is actuated for dock (primary) the device target half.

The latching mechanisms slowly and softly capture the device target half and are clamped tightly or hardly. When coupling half is clamped with the target half, the quick female couplings are pushed to the quick male coupling. When both quick couplings are connected, it will open the passage to flow the propellant/fuel.

When the dual docking and quick coupling process is completed, the service satellite initiates to transfer the propellant or fuel to the target satellite. The propellant is transferred through quick couplings and a bubble suppressor ensures the bubble is not entering into client satellite propellant tank or their propulsion systems. After done with the propellant transfer in ground or refuelling in the on-orbit, the service satellite gives the command to device coupling half to detaching (undocking) it. The device coupling half releases the latching mechanism and is moved away from the target satellite.

The embodiments of the disclosed device are satellite fill valves or drain valves combined with a simplified docking interface for ground and on-orbit operations.

The present disclosure discloses the device which is more effective in transferring a fluid by simultaneously employing docking mechanism and refuelling port methods. This will introduce a device used to dock the satellite and fill/refuel a satellite in a single device itself.

The device is configured such that it can transfer oxidizer, or fuel, or pressurants or recharge the battery or transfer the data. The device refuelling quick couplings have a double stage shut-off valve that is used to prevent leakage either in atmosphere or in space.

The device can transfer the propellant for low to high pressure and low to high flow rate conditions for all propellants. For example, the fluids may be UDMH, MMH, $N_2O_4$, $H_2O_2$, water, kerosene, methanol, green propellants, isopropyl alcohol, HFE, nitrogen gas, helium gas, xenon gas, krypton gas, etc.

Referring to FIG. 3, it illustrates: (a) a sectional view of a complete assembly of a device (b) an isometric view of the complete assembly of the device. FIG. 3 depicts:

1) Servo Motor 302A also referred to as Drive Motor,
2) The latching mechanism 303,
3) The device coupling half 305,
4) The device target half 310,
5) The refuelling quick couplings (male) 304,
6) The bubble suppressor 316,
7) The refuelling quick couplings (female) 314,
8) The quick coupling holder 315,
9) The holding plates 317,
10) The guide pin holder (target half) 312,
11) The guide pin with servo motor (coupling half) 306 and 302B.

Referring to FIG. 5, illustrates a sectional view of refuelling quick couplings in open position, in accordance with an embodiment of the present disclosure. FIG. 5 depicts:

1) Refuelling Quick couplings (male) (Target half) 504,
2) Bubble Suppressor 516,
3) Perforated disc 518,
4) First stage shut-off valve 519,
5) Second stage shut-off valve 520,
6) Seal 521,
7) Spring 522,
8) Retainer 523,
9) Quick couplings body 524,
10) Refuelling Quick couplings (female) (coupling half) 514.

FIG. 10, a) shows both the service satellite device end and client satellite end in an open position. At both ends of device, the first and second seals are closed, ensuring no pressure leakage.

FIG. 10, b) shows the state when both ends are initiated to touch.

FIG. 10, c) shows that both ends are docked by latching mechanisms and opening the first seal. The first seal is pushing towards the second seal and trying to open. The second seal remains closed in these positions.

FIG. 10, d) shows that both the seals are opened entirely, and fuel is transferred safely from the service satellite to the client satellite.

The present disclosure is the on-orbit refuelling in the current satellite paradigm and proposes a new paradigm for future satellite designs. The present disclosure discloses simplified device/interface and is low weight and cost-effective. The embodiments of the present device (also referred to as disclosed device) are satellite fill/drain valves combined with a simplified docking interface for ground and on-orbit operations.

The alternative embodiments of the present disclosure include:

Refuelling quick couplings geometry: quick coupling size, shape and angle can be changed.

1) Refuelling quick coupling shut-off valve stages: Number of stages can be increased or decreased (any number of stages)
2) Bubble suppressor: Mesh size and shape can be changed. And a multi-stage bubble suppressor can be used.
3) Quick coupling holder: Holder size and shapes can be changed.
4) Holding plate: Holding plate size and shapes can be changed.
5) Guide pin with servo motor: Guide pin size and shape can be changed. Also, the guide pin can be a mechanical pin or any type of electrical or electronics or laser type or magnetic type.
6) Latching mechanisms: Latching/clamping size and shape can be changed. The clamp can be used as a hold type or push type, or any other method.

Thus, the disclosed device is implemented for dual use, firstly, for docking a vehicle in motion and for transferring a fluid to the vehicle that is in motion is disclosed. The disclosed device includes an autonomous docking and refuelling technology made with dual redundancy as per space agency rules. The disclosed device includes a satellite fill-and-drain valve combined with a docking interface and it can be used on the ground on earth and on-orbit refuelling. Also, the disclosed device includes a bubble suppresser at both ends. The latching mechanism and dual seal layout of the disclosed device ensures a safe propellant transfer. As a result, the device can be used for low to high pressure in the atmosphere and microgravity conditions. The guide pin or latch mechanism of the disclosed device allows for self-aligning operations during the docking process without complex robotic arms.

The device as disclosed provides advancement to refuel the satellite on-orbit itself. This means, the satellite can be refueled at ground filling and on-orbit refuelling with a low weight with minimum operation steps/process.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible.

I claim:

1. A device for a service vehicle in motion for autonomously dual docking with and transferring fluid to a vehicle that is in motion, the device comprising a first part and a second part;

the first part communicatively coupled to the service vehicle and the second part communicatively coupled to the vehicle in motion;

at least one guide pin of the first part configured for being inserted into at least one guide pin holder of the second part for electro-mechanically actuating a servo motor of the first part to rotate or translate the at least one guide pin to enable a soft capture of the second part into the first part; and two or more male quick couplings of the first part configured for being inserted into two or more female quick couplings of the second part for initiating a servo-driven latching mechanism using the servo motor of the first part for hard clamping of the second part into the first part only after the soft capture is achieved, for transferring the fluid to the vehicle in motion from the service vehicle.

2. The device of claim 1, further comprising two or more bubble suppressors placed in the path of the fluid in the two or more male quick couplings of the first part and in the two or more female quick couplings of the second part for transferring the fluid to the vehicle in motion by suppressing the formation of bubbles under micro-gravity conditions.

3. The device of claim 2, wherein the fluid is transferred to the vehicle in motion using shut-off valves, through the two or more male quick couplings and the bubble suppressor, wherein the bubble suppressor is configured to restrict an entry of a bubble into a storage tank of the vehicle in motion.

4. The device of claim 1, wherein the at least one guide pin is threaded and configured for enabling the soft capturing of the second part into the first part with the translational movement without affecting the positions of the service vehicle and the vehicle in motion.

5. The device of claim 1, wherein the first part of the device comprises a first coupling holder configured for holding the two or more male quick couplings of one of threaded type, unthreaded type, magnetic holding type, or slotted type; and a first holding plate for connecting the first coupling holder and the at least one guide pin.

6. The device of claim 1, wherein the second part of the device comprises a second coupling holder configured for holding the two or more female quick couplings of one of threaded type, unthreaded type, magnetic holding type, or slotted type; and a second holding plate for connecting the second coupling holder and the at least one guide pin holder.

7. The device of claim 1, wherein the servo motor is coupled to drive the at least one guide pin or the latching mechanism for docking or clamping the first part of the device and the second part of the device.

8. The device of claim 1, wherein the latching mechanism is released by the first part and the guide pin is moved away from the guide pin holder of the second part, after the transfer of the fluid to the vehicle in motion.

* * * * *